Patented May 28, 1940

2,202,328

UNITED STATES PATENT OFFICE 2,202,328

QUATERNARY AMMONIUM SALT

Otto Albrecht, Basel, Switzerland, assignor to the firm Society of Chemical Industry in Basle, Basel, Switzerland No Drawing. Application April 20, 1935, Serial No. 17,542. In Switzerland April 23, 1934

1 Claim. (Cl. 260—295)

This invention consists in the manufacture of valuable quaternary salts from compounds of the general formula $xR.CO.R_1$, wherein $x=$ a reactive halogen, $R=$ the radical of an aliphatic, cyclo-aliphatic or cyclo-aliphatic-aliphatic hydrocarbon containing at least 8 carbon atoms, $R_1=OH$, $OR_3$ or $NR_4R_5$ ($R_3=$ any radical containing fewer than 6 carbon atoms, $R_4$ and $R_5=H$ or any organic radical), i. e., such radicals which impart to the CO-group of the general formula $x$—$R.CO.R_1$ the character of the CO-group of an acyl radical, by treating the compound with a heterocyclic tertiary amine containing at least one six membered ring.

As parent materials there may be named by way of example halogen fatty acids of high molecular weight, for instance, mono- or polychloropalmitic acids which contain 1–6 chlorine atoms in the molecule; also tetra- or hexa-chloropalmitic acid, α-bromolauric acid, α-bromomyristic acid, α-bromopalmitic acid, α-bromostearic acid, α-bromomontanic acid, 12-bromo-octadecen-(9)-acid-(1), α-iodostearic acid, chlorinated or brominated naphthenic or resin acids, as well as salts of these acids. A suitable parent material is provided by an ester of such a carboxylic acid formed from a mono- or polyhydric alcohol containing fewer than 6 carbon atoms, for instance methyl-, ethyl- or amyl-alcohol, glycol, glycerine. Also the amides of the carboxylic acids in question which are substituted at the nitrogen atom by alkyl-, cycloalkyl- or aryl-radicals, for instance α-bromolauric acid amide, α-bromolauric acid-monomethylamide, α-bromolauric acid-dimethylamide, α-bromostearic acid-diethylamide, an α-bromopalmitic acid-hydroxyalkylamide, α-bromostearic acid anilide, α-bromostearic acid-2:5-dichloranilide, α-bromostearic acid-meta-nitranilide, α-bromostearic acid-ortho-methoxyanilide, α-bromolauric acid-ethylphenylamide, α-bromolauric acid-methylphenylamide, α-bromostearic acid-benzylamide, α-bromopalmitic acid-ethylbenzylamide, α-bromostearic acid-benzylphenylamide, and the like, are suitable for the reaction with the tertiary amine. As heterocyclic tertiary amines, for instance pyridine, quinoline or their homologues.

For making the quaternary salts a mixture of the halide with the tertiary amine may be left at rest at ordinary temperature or at raised temperature. The mixture may contain a solvent or a catalyst, for instance finely subdivided copper, a copper compound or sodium iodide. If one of the reacting components is easily volatile the operation may be conducted under pressure.

The quaternary salts made by this invention therefore correspond to the general formula

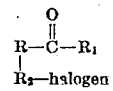

in which R represents an aliphatic hydrocarbon radical having at least 8 carbon atoms, $R_1$ a radical which imparts to the C=O-group the character of the CO-group of an acyl radical, $R_2$ the radical of a heterocyclic quaternary ammonium compound containing at least one six membered ring linked by its N-atom to halogen and to R of the radical

These quaternary salts have capillary active properties which make them suitable for application as textile assistants, for example as agents for wetting, cleaning or emulsifying. They are also suitable as additions to acid dye-baths, for instance in dyeing with chromium compounds, with mordant-dyeing dyestuffs or with dyesuffs which dye in an acetic acid bath. Furthermore, they can be used for softening the fiber and for enhancing the fastness to water of dyeings on textile materials. The quaternary salts may be used alone or together with solvents, electrolytes, soaps, soapy materials or protective colloids.

The following examples illustrate the invention, the parts being by weight:

Example 1

5 parts of α-bromostearic acid-ethylester are heated together with 10 parts of pyridine for 2 hours on the boiling water-bath. After distilling the excess of pyridine there is obtained a viscid oil which is dissolved by water to a clear solution of very low surface tension, which foams strongly when shaken. In similar manner the α-bromolauric acid-ethylester or the α-bromopalmitic acid may be converted into the quaternary pyridinium salt. Such products have for example the formula

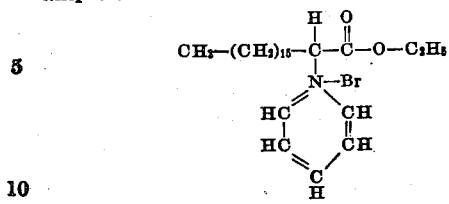

or

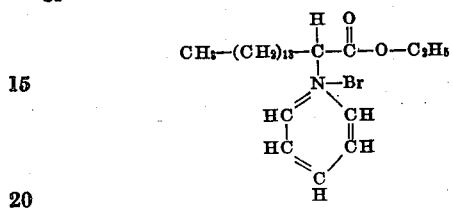

For making fast to water a dyeing of 2 per cent. strength, produced by Cotton Yellow CH (Schultz Farbstofftabellen, 7th edition, No. 726) on cotton piece-goods, the dyed material is treated with a solution which contains 1 per cent. calculated on the weight of the fibrous material, of the pyridinium bromide made from α-bromostearic acid-ethylester. After 20 minutes, the goods are wrung out and dried. The blue-dyed piece-goods do not bleed in cold water.

*Example 2*

1 part of α-bromostearic acid-amide, obtainable by the introduction of α-bromostearic acid-bromide into an excess of a solution of ammonia, is heated together with 1 part of pyridine for 1 hour in the boiling water-bath. After cooling, the precipitate which has separated is filtered from the mother liquor. The powder thus obtained dissolves to a clear solution in water, which foams strongly when shaken. The new compound corresponds to the formula

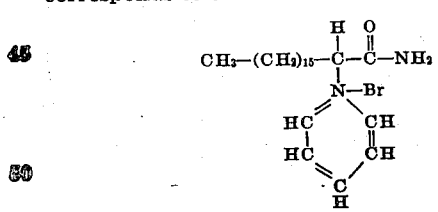

For softening viscose artificial silk the latter is treated for 20 minutes in a bath containing per liter 0.2 gram of the pyridinium-bromide made as described in the preceding paragraph. The material is then centrifuged and dried. The viscose artificial silk thus treated is characterized by a soft, pliable grip.

For dyeing wool, there may be used a bath containing, calculated on the weight of the fiber, 3 per cent. of Neolan Bordeaux R (Schultz, Farbstofftabellen, 7th edition, vol. II, page 153), 5 per cent. of sulfuric acid and 0.1 per cent. of the pyridinium-bromide made as described in this example; the wool is entered at 60° C. and the bath is heated within 20 minutes to boiling and boiling is continued for 1½ hours. The goods are rinsed and dried and then show a level dyeing deeper than that obtainable under the same conditions without the added pyridinium bromide.

*Example 3*

10 parts of α-bromostearic acid and 20 parts of pyridine are heated together on the boiling water-bath until the product of the reaction is soluble in water, which occurs in about 1 hour. When the pyridine has been distilled there is obtained a powder suitable for making fast to water cotton dyeings or for softening artificial silk. The new compound corresponds to the formula

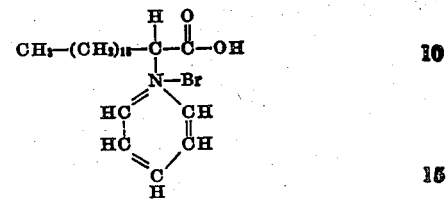

*Example 4*

A solution of 60 parts of α-bromostearic acid-bromide in about 100 parts of benzene, at a temperature below 20° C., is dropped gradually into 27.5 parts of aniline diluted with about 100 parts of benzene. After standing for several hours the product which has separated is filtered from the mother liquor by suction, washed with benzene and dried. The α-bromostearic acid-anilide, from which aniline-hydrobromide has been removed by washing with water, is, when dry, a nearly colorless powder. It corresponds to the formula

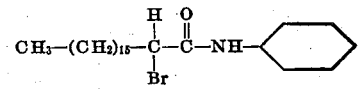

For converting it into the quaternary pyridinium salt the anilide is heated together with twice its weight of pyridine on the boiling water-bath until a product soluble in water is obtained. The mass is then diluted with water and evaporated to dryness, preferably under diminished pressure. There remains a tough mass the aqueous solution of which foams strongly when shaken.

For making fast to water a dyeing of 2.5 per cent. strength of Chlorantin Light Red 5BL (Schultz, Farbstofftabellen, 7th edition, vol. II, page 48) on cotton piece-goods, the latter are treated after the dyeing with a solution of 0.75 per cent. of the pyridinium bromide obtained from α-bromostearic acid-anilide, calculated on the weight of the fibrous material. After 20 minutes the goods are wrung out and dried. They do not bleed in cold water.

*Example 5*

A solution of 68 parts of α-bromolauric acid-bromide in about 60 parts of benzene, at a temperature below about 20° C., is dropped gradually into 41 parts of aniline diluted with 70 parts of benzene. The product separates from the solution allowed to stand overnight; it is collected on a suction filter, washed with benzene and dried. When separated from aniline hydrobromide and again dried the α-bromolauric acid-anilide is a slightly colored powder.

For converting it into the quaternary pyridinium salt the anilide is heated together with double its weight of pyridine on the boiling water-bath until a product soluble in water is obtained. The mass is then diluted with water and dried. The dried mass is tough and yields a solution in water which foams when shaken and can be used in manner similar to that described with reference to the products of the preceding examples.

What I claim is:
The quaternary ammonium salt of the general formula
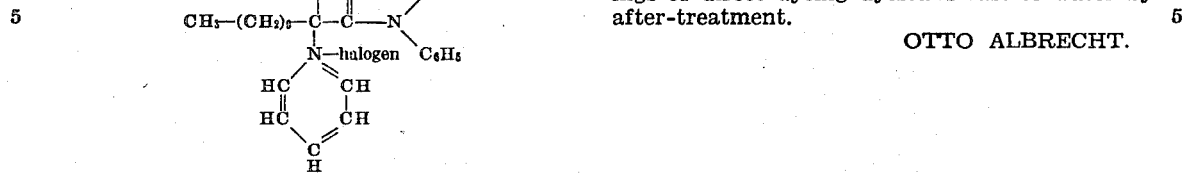
which product is a water-soluble powder whose aqueous solutions have capillary active properties, and which is capable of rendering the dyeings of direct dyeing dyestuffs fast to water by after-treatment.
OTTO ALBRECHT.